UNITED STATES PATENT OFFICE.

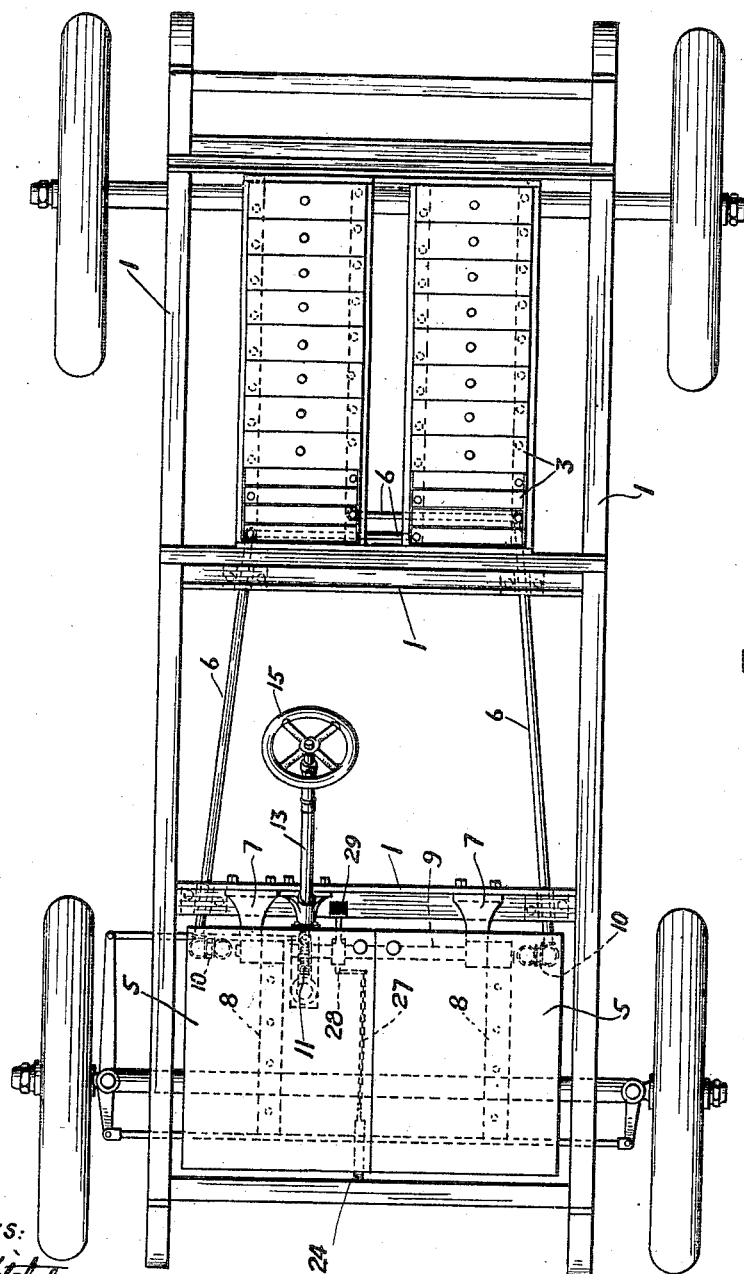

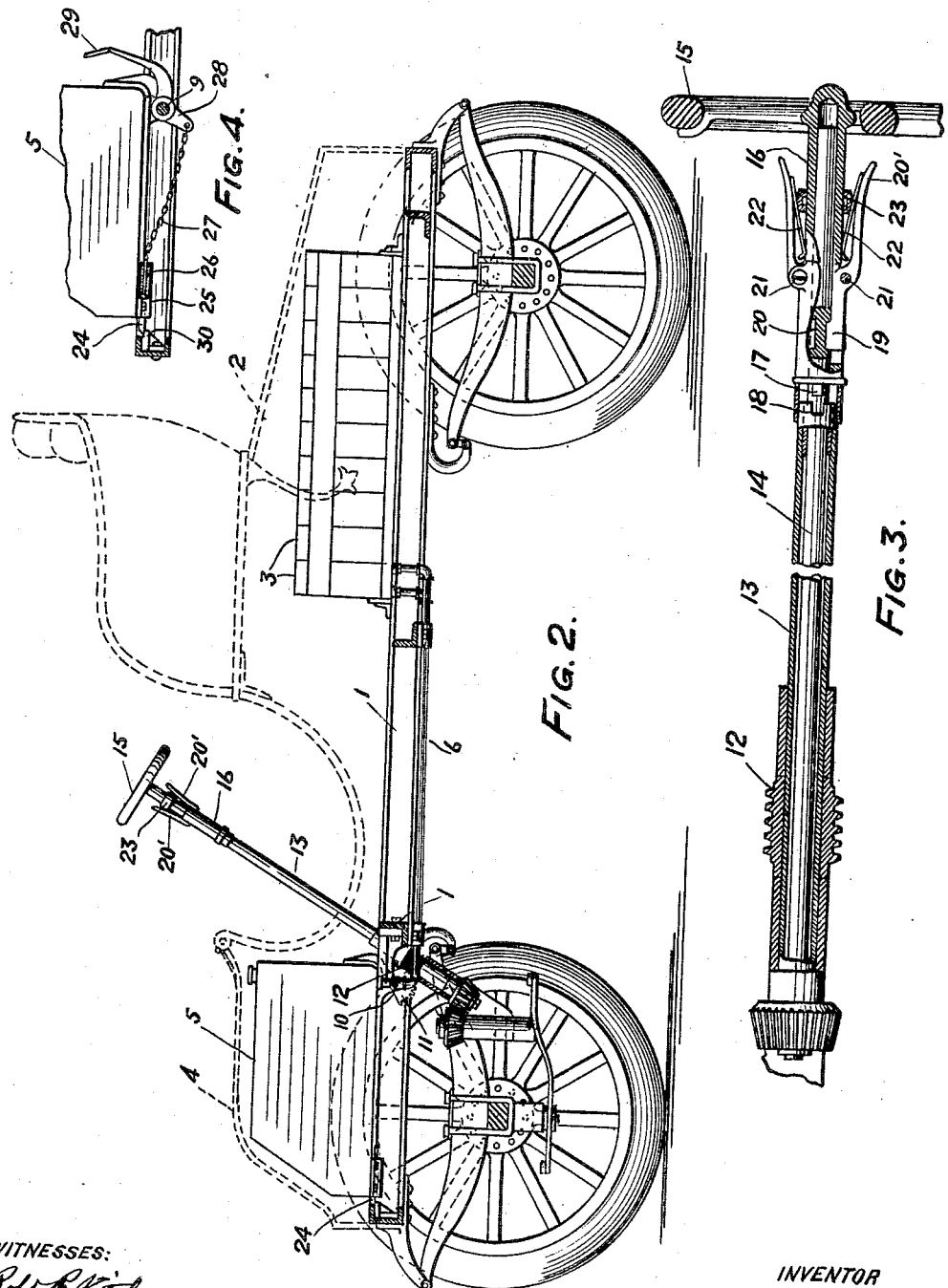

FRANK A. DECKER, OF PHILADELPHIA, PENNSYLVANIA, ASSIGNOR TO DECKER ELECTRICAL MANUFACTURING COMPANY, OF WILMINGTON, DELAWARE, A CORPORATION OF DELAWARE.

BATTERY-TANK SYSTEM.

971,597. Specification of Letters Patent. Patented Oct. 4, 1910.

Application filed January 10, 1910. Serial No. 537,189.

*To all whom it may concern:*

Be it known that I, FRANK A. DECKER, a citizen of the United States, residing at Philadelphia, in the county of Philadelphia and State of Pennsylvania, have invented a Battery-Tank System, of which the following is a specification.

This invention relates to improved means for charging and draining battery solutions, and it contemplates the connection of batteries with tanks so that the solutions can very readily be drawn from the cells into the tanks when it is desired to discontinue the battery action and returned from the tanks to the cells when it is desired to continue the battery action. In the preferred construction, the tanks, being connected by conduits with the bottoms of the cells, can be lowered and elevated to draw off and return the solutions by gravity, and as applied to electrical vehicles, these tanks are provided with means whereby the operator can rock them about an axis to the positions for charging and discharging without leaving his seat.

In the drawings, Figure 1 represents a plan view of an automobile having my invention applied thereto; the body of the vehicle being removed; Fig. 2 is a side view of the same with the body in place; Fig. 3 is a longitudinal sectional view of means connected with the steering gear for lowering and raising the tanks; and Fig. 4 is a detail view of the latch mechanism.

The automobile represented in the drawings has, supported on the rear end of its frame 1 within the body 2, the battery 3, and, on the front end of the frame within the casing 4, the tanks 5, the respective tanks being connected by the corresponding pipes 6 with the bottoms of the respective fluid compartments of the battery. The tanks are pivoted on the frame by means of the hinges 7 and 8 connected by the rod 9 which turns in the hinges 7 and is fixed to the hinges 8, the pipes 6 being connected with the tanks by any suitable flexible connections as the rotatable joints 10 having their centers in line with the axis of oscillation of the tanks.

To lower and elevate the tanks a segmental worm gear 11 is fixed thereto and is engaged by a worm 12, which is fixed to a hollow shaft 13 on the steering shaft 14 and revoluble with reference thereto.

The shaft 13 for rocking the tank and the shaft 14 for operating the steering gear are respectively adapted to be fixed, alternately, to the steering wheel or handle 15 by means of a sleeve 16 loose on the shaft 14 and fixed to the wheel, the sleeve having clutching jaws 17 adapted to be moved into engagement with the clutching jaws 18 on the shaft 13 and the clutching dogs 19 adapted to be moved into engagement with the recesses 20 of the shaft 14. These dogs are pivoted on the bearings 21 of the sleeve, being disengaged by means of their handles 20′, engaged by the springs 22, and locked by the ring 23 which is slipped under the handles.

To support the outer end of the tanks when they are elevated a latch 24 is connected in reciprocating relation to the bottom of the tanks by the keeper 25, being pressed outwardly by a spring 26 and withdrawn against the action of the spring by a chain 27. A lever, fulcrumed on the shaft 9, has its arm 28 connected with the chain and its arm 29 projecting into position to be pressed by the foot of the operator. Upon pressing the part 29, the latch 24 is withdrawn from engagement with the catch 30 fixed to the frame, and the tanks can be lowered through the operation of the worm gear, upon which the cells are emptied into the tanks by gravity. Upon elevating the tanks to recharge the cells, the latch automatically engages the catch and holds the tanks in their elevated position, the cells being recharged from the tanks by gravity.

The tanks are preferably constructed with a capacity double that of the cells to provide a store of solution and enable the action of the battery to be prolonged beyond the time required for exhausting a single charge of solution.

It will be understood that by "charging" is meant the filling of the cells to a greater or less degree with electrolyte.

Having described my invention, I claim:

1. In apparatus of the class described, a vehicle, a cell and a tank supported thereby, a conduit having a rotary joint for connecting said tank with said cell, and mechanism for rocking said tank in relation to said cell.

2. In apparatus of the class described, a cell, a tank, means for connecting said parts, a pivotal support upon which said tank oscillates relatively to said cell, a gear fixed in relation to said tank and a worm for operating said gear.

3. In apparatus of the class described, a pivoted tank, a battery communicating with said tank, a gear fixed in relation to said tank, a revoluble shaft having a worm thereon for engaging said gear and rocking said tank, and a handle for revolving said shaft.

4. In apparatus of the class described, a vehicle, a steering mechanism therefor comprising a revoluble shaft, a hollow shaft sleeved on said first shaft and revoluble with relation thereto, a handle, means for engaging said handle with said shafts alternately, a pivoted tank, and mechanism connected with said hollow shaft for rocking said tank.

5. In apparatus of the class described, a vehicle, a battery carried thereby, a tank pivoted on said vehicle, a fluid connection between said battery and tank, a revoluble shaft, mechanism operated by said shaft for rocking said tank, and a latch for holding said tank in position.

6. In apparatus of the class described, a vehicle, a tank pivoted thereon, a revoluble steering shaft, a hollow shaft revoluble on said steering shaft, mechanism operated by said hollow shaft for rocking said tank, a handle and fixed thereto a sleeve revoluble on said steering shaft, and mechanism for engaging said sleeve to said shafts alternately.

7. In apparatus of the class described, a vehicle frame, a battery thereon, a tank thereon with a fluid connection to said battery, mechanism for engaging said tank and supporting it on said frame, and means for disengaging said mechanism.

In witness whereof I have hereunto set my name this 8th day of January, 1910, in the presence of the subscribing witnesses.

FRANK A. DECKER.

Witnesses:
ROBERT JAMES EARLEY,
JOS. G. DENNY, Jr.